(12) United States Patent
Jönsson et al.

(10) Patent No.: US 6,939,425 B1
(45) Date of Patent: Sep. 6, 2005

(54) METHOD AND DEVICE FOR THE MANUFACTURE OF CORRUGATED MATERIAL

(75) Inventors: Anders Jönsson, Helsingborg (SE); Jörgen Ingvarsson, Ängelholm (SE); Jacob Volckerts, Helsingborg (SE)

(73) Assignee: Wellplast AB, Munka-Ljungby (SE)

( * ) Notice: Subject to any disclaimer, the term of this patent is extended or adjusted under 35 U.S.C. 154(b) by 290 days.

(21) Appl. No.: 10/031,956

(22) PCT Filed: Jul. 28, 2000

(86) PCT No.: PCT/SE00/01520

§ 371 (c)(1),
(2), (4) Date: Jan. 22, 2002

(87) PCT Pub. No.: WO01/08878

PCT Pub. Date: Feb. 8, 2001

(30) Foreign Application Priority Data

Aug. 2, 1999 (SE) .................................. 9902826

(51) Int. Cl.[7] .............................................. B31F 1/22
(52) U.S. Cl. ..................................... 156/210; 156/470
(58) Field of Search ............................... 156/197, 200, 156/201, 208, 275.1, 210, 461, 462, 470, 156/471, 474, 290, 292, 308.4, 583.1, 581

(56) References Cited

U.S. PATENT DOCUMENTS 2,454,719 A * 11/1948 Scogland ..................... 156/155
2,547,880 A * 4/1951 Meyer et al. ............... 156/201
3,666,590 A    5/1972 Susuki et al.
3,744,952 A    7/1973 Bequet et al.
4,132,581 A    1/1979 Swartz
4,188,253 A    2/1980 Swartz (Continued)

FOREIGN PATENT DOCUMENTS

FR           2081256         12/1971
FR           2088069          1/1972
WO           WO9405489        3/1994

*Primary Examiner*—Gladys JP Corcoran
(74) *Attorney, Agent, or Firm*—John R. Ley; Anders Hansson

(57) ABSTRACT

Method and device for the manufacture of corrugated material, at least one first plane sheet (19; 20) and one second sheet (16) of plastic material arranged in wave shape being brought together for adhesion to each other and the wave-shaped sheet (16) running over core bars (17, 18). A portion of at least one sheet is heated at abutment against the core bars (17, 18) and the first sheet (19; 20) is brought to abutment against the second sheet (16) for welding the sheets (16; 19, 20) together.

Figure 1:
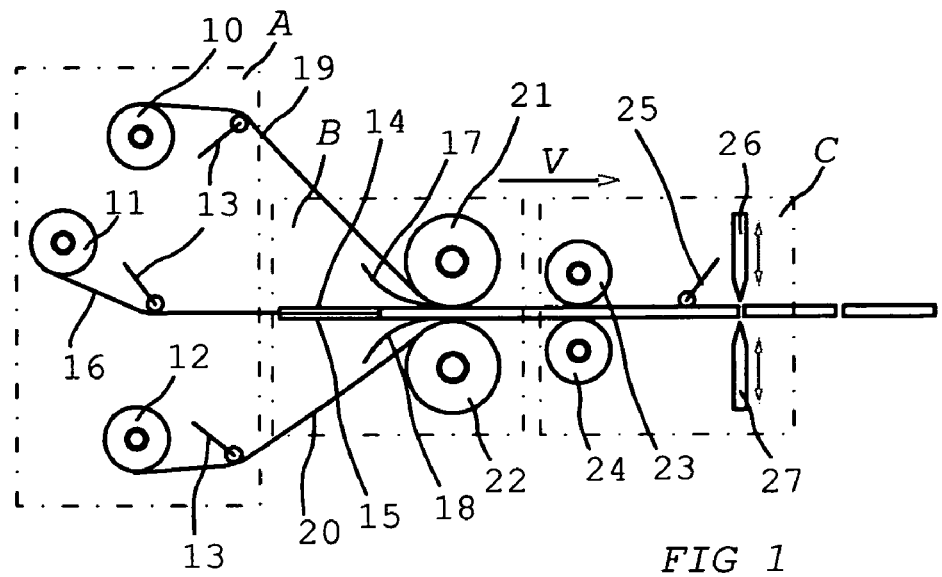

First members are arranged for feeding at least the first plane sheet and the second sheet of plastic material running over core bars (17, 18) and second members are arranged for bringing together and adhering the sheets. Heating members (28) are arranged for transferring heat to a portion of at least one sheet (16; 19, 20) abutting against the core bars and including plastic material. Furthermore, guide members (17, 18; 21; 22) are arranged for bringing together the first and the second sheet in an abutment portion and for welding in the portion heated by the heating members (28).

18 Claims, 2 Drawing Sheets

U.S. PATENT DOCUMENTS

| | | |
|---|---|---|
| 4,267,223 A | 5/1981 | Swartz |
| 4,897,146 A | 1/1990 | Inzinna |
| 4,957,577 A * | 9/1990 | Huebner ..................... 156/197 |
| 5,252,163 A * | 10/1993 | Fell ............................ 156/205 |
| 5,399,221 A * | 3/1995 | Casella .................... 156/274.4 |
| 5,508,083 A * | 4/1996 | Chapman, Jr. .............. 428/167 |

\* cited by examiner

METHOD AND DEVICE FOR THE MANUFACTURE OF CORRUGATED MATERIAL

FIELD OF INVENTION

The invention relates to a method and a device for the manufacture of corrugated material, at least one first plane sheet and one second sheet of plastic material arranged in wave shape being brought together for adhesion to each other and the wave-shaped sheet running over core bars. First members are arranged for feeding at least one plane sheet and one second sheet of plastic material running over the core bars and second members are arranged for bringing together and adhering the sheets.

PRIOR ART

Since long, different forms of corrugated board have been manufactured and used, above all for packing and the like. Corrugated board has very good insulating and shock-absorbing properties, but it is also impaired by a plurality of disadvantages. The largest disadvantage is, perhaps, the bad moist-resistance thereof. When corrugated board becomes damp, it looses a large part of the supporting capacity and durability thereof.

It is also known, per se, to form sheets of plastic material to wave shape and connect such wave-shaped sheets with plane sheets of similar material. An example of this is shown and described in U.S. Pat. No. 4,897,146. The sheet that is to be wave-shaped is heated by particular heating members, making the material plastic. The material is then formed to wave shape with core bars and one side of the wave-shaped material is pressed against a pre-heated plane sheet by a forming drum, which is made with recesses being ring-shaped and adapted to the core bars. An additional plane sheet is heated in the similar way and is pressed against the other side of the wave-shaped material by a second preferably cooled drum.

The material that the sheets are made of is relatively stiff and the thickness of the sheets is such that at least the sheet that is to be wave-shaped has to be heated to such a high temperature that the material becomes plastic. When the joined sheets have cooled, the result is a corrugated sheet material, which, e.g., may be used as roof or wall panels. The device and method according to U.S. Pat. No. 4,897,146 works well for the intended purpose, but is less suitable for other purposes, e.g. for the manufacture of corrugated material for packing and the like.

THE INVENTION IN SUMMARY

An object of the invention is to provide a method for the manufacture of corrugated material of a plurality of material sheets, which are brought over core bars and heated and joined together in an effective way. An additional object is to provide a device for the manufacture of corrugated material of at least one first sheet and one second sheet.

According to the method, at least one sheet is heated at abutment against the core bars, the first and the second sheet abutting against each other at the heating.

The device comprises heating members for the transfer of heat from the core bars to at least one sheet abutting against the core bars and comprising plastic material, and guide members for bringing together the first and the second sheet at the heating.

By the invention, the use of a plurality of different materials for the different layers in the corrugated product is enabled. Materials of different stiffness, toughness, friction and shock-absorption may, e.g., be chosen. The invention also enables a faster process start up without any extensive heating of drums or the like. A manufacturing process may also be finished faster and be temporarily stopped.

The finished product has a plurality of the advantages of the corrugated cardboard, such as very good insulating and shock-absorbing properties, but has in addition higher moist-resistance and durability. Furthermore, packages having been manufactured of the finished product may be spray steam heated. Such packages neither emit dust particles. A material suitable in connection with the invention is blown polyethylene film with chalk as filler. For many applications, it is suitable with a film thickness in the range of 0,03–0,4 mm.

Packages and other products that have been produced according to the invention are especially suitable in the food industry. Also in the pharmaceutical industry and the medical field, it may be advantageous to use the invention.

SHORT DESCRIPTION OF THE DRAWINGS

Figure 2:
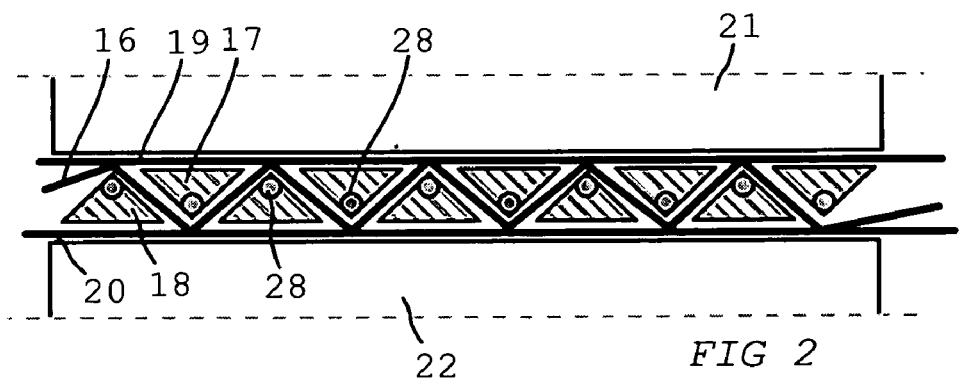
Figure 3:
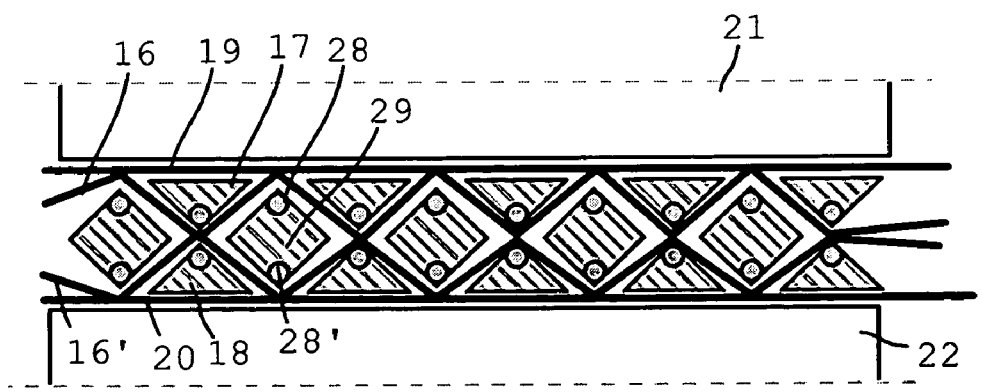
Figure 4:
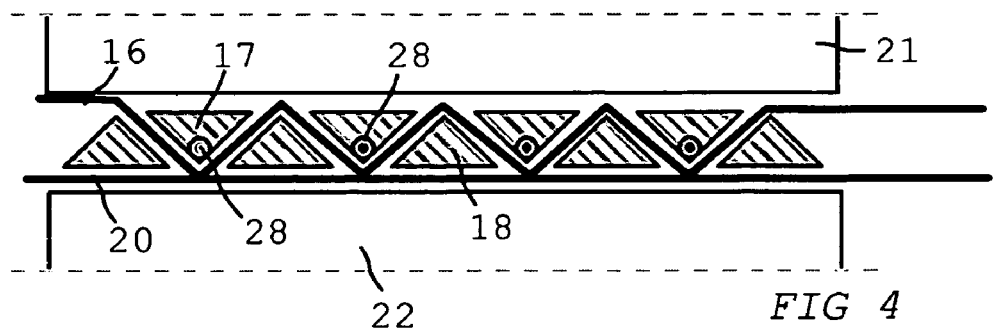
Figure 5:
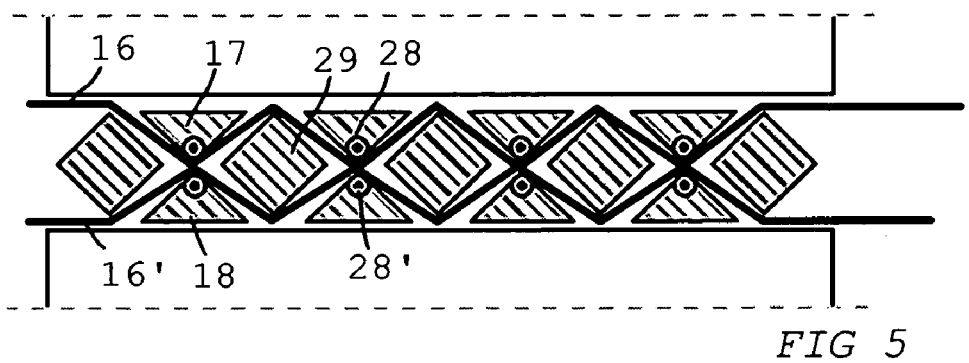
Figure 6:
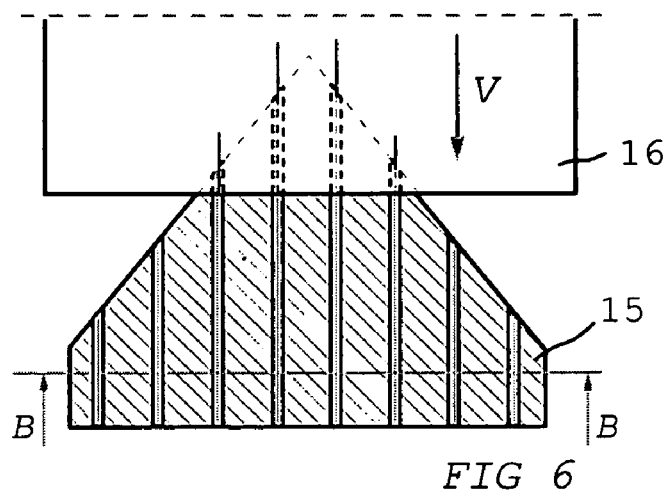
Figure 7:
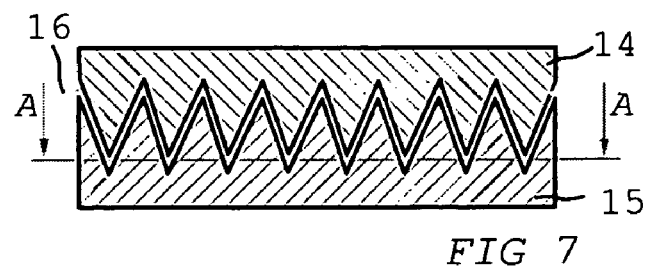

The invention will now be described closer by embodiment examples, reference being made to the accompanying drawings, where FIG. 1 is a side view of an embodiment of the device according to the invention, FIG. 2 is a cross-sectional view, which shows how a corrugated material according to a first embodiment is produced, FIG. 3 is a cross-sectional view, which shows how a corrugated material according to a second embodiment is produced, FIG. 4 is a cross-sectional view, which shows how a corrugated material according to a third embodiment is produced, FIG. 5 is a cross-sectional view, which shows how a corrugated material according to a fourth embodiment is produced, FIG. 6 is a longitudinal section view from the line A—A in FIG. 7 of member for corrugation of the material and FIG. 7 is a cross-sectional view from the line B—B in FIG. 6 of the member in FIG. 6.

THE INVENTION

FIG. 1 shows in principle how a manufacturing line, which operates according to the invention, may be made. A first part A, which is shown with dash and dot lines, comprises a first roll 10, a second roll 11 and a third roll 12, all wound up with a suitable sheet material, as well as conventional sheet stretching members 13. The different sheet materials are brought together in a second part B and form different layers of the finished corrugated material. It should be observed that material thickness, mutual distance between different components and other geometrical relations in FIG. 1 as well as subsequent figures are not true to scale. A plurality of dimensions and distances have been changed in relation to real conditions in order to show features of the invention more clearly.

The elements that are included in part A may all be made according to prior art. However, it is important to notice that various sheet materials, both thickness and the material as such, may be arranged on the different rolls. For most applications, it is suitable to use polyethylene (PE) and polypropylene (PP) with or without so called fillers. A suitable filler may be chalk.

Within the scope of the invention, entirely other materials may also be used. For instance, it is possible to use aluminum or other similar material in some layer in order to achieve high tightness against gas permeation. Materials that in itself cannot be heated together with the material of an adjacent sheet should be coated with or arranged next to a plastic layer.

The sheet or sheets 16 that are to be corrugated or formed in wave shape are preferably wider and rolled on wider rolls than other sheets, so that the finished corrugated material comprises equally wide layers. If the sheet 16 is narrower, it will be stretched during the corrugation. Before this sheet 16 is brought together with other sheets, it is suitably corrugated in a corrugation device. In the embodiment shown, the corrugation device comprises an upper plate 14 and a lower plate 15, which is described closer reference being made to FIG. 6 and FIG. 7. An alternative embodiment of a corrugation device comprises two cylinders. In such an embodiment, it may be suitable to pre-heat the sheet 16 before the corrugation and then cool the sheet 16 afterwards.

The wave shape created by the corrugation device has conventional peaks separated by valleys. As discussed in conjunction with FIGS. 6 and 7, the peaks are formed by the ridges and the valleys are formed by the recesses of the plates 14 and 15 of the corrugation device.

After the corrugation device, the corrugated sheet 16 is led in between at least one set of upper core bars 17 and one set of lower core bars 18. These are described further below, reference being made to FIGS. 2–5. An upper sheet 19 from the first roll 10 and a lower sheet 20 from the third roll 12 are brought together with the corrugated sheet 16 at the core bars 17 and 18. The core bars 17 and 18 extend in the common long direction V of the sheets, which is indicated at the corresponding arrow in FIG. 1. In certain applications, the corrugation device may be omitted or be integrated with the core bars. The two sets of core bars 17 and 18 are suspended behind or outside the sheets in a way not shown closer.

The sheets are heated by the core bars 17 and 18 and joined together to a corrugated sheet material through co-operation with an upper press roll 21 and a lower press roll 22. After the joining, the ready-formed sheet material is brought further in the direction of the arrow V in a conventional way by an advancing upper driving roll 23 and an advancing lower driving roll 24. The upper press roll 21 and the lower press roll 22 may in some embodiments together advance the sheet material in a desired way. In such a case, the driving rolls 23 and 24 may be omitted.

The driving rolls 23 and 24 are included in a third part C, which in a conventional way may comprise at least one guide roller 25 and one cutting mechanism. In the embodiment shown, the cutting mechanism comprises an upper knife 26 and a lower knife 27 co-operating therewith. The knives 26 and 27 suitably move up and down and cut off the sheet material in sheets of suitable length. Additional cutting devices cut the sheets to desired width. The size of the sheets is, to a large extent, dependent on the application for which they are intended. The third part C constitutes not in itself part of the invention and may be given another design depending on the application in question.

In FIG. 2, an example is shown of how the core bars may be arranged when a sheet material having three layers, one of which is corrugated, is to be produced. In this case, an upper line of core bars 17 is arranged with a certain mutual distance between adjacent core bars. A lower line of core bars 18 is arranged with the same mutual distance, but displaced in relation to the upper line, so that the space between the core bars is filled out with space for an intermediate sheet of material.

All core bars have, in this embodiment, triangular cross-section, but other shapes may be chosen depending on the application in question. The sheet 16 that is to be corrugated runs between the upper line of core bars 17 and the lower line of core bars 18. The upper sheet 19 runs exactly above the upper line of core bars 17 and will be pressed against the sheet 16 between the lower line of core bars 18 and the upper press roll 21. Correspondingly, the lower sheet 20 runs exactly below the lower line of core bars 18 and will be pressed against the sheet 16 between the upper line of core bars 17 and the lower press roll 22.

The pressure that is effected by the press rolls 21 and 22 may in an alternative embodiment be generated by difference in ambient pressure or by the fact that the material in the sheets is stretched in the latitudinal direction. In such a case, the press rolls 21 and 22 may be omitted. An additional alternative to the press rolls 21 and 22 may be reciprocating press plates. The press plates are quickly brought towards the core bars and press together a portion of the sheets in the way described above during the phase when the sheets are welded together. Next, the press plates are retracted, so that the sheets may be fed forwards and a new portion of the sheets comes in the correct position for welding together.

At least parts of the portions of the core bars 17 and 18 which abut against the sheet 16 and/or the upper sheet 19 and/or the lower sheet 20 are provided with heating members 28. By the heating members 28, heat is transferred to abutting and adjacent material sheets to such an extent that a joining of the sheets is achieved. The heating is local in smaller contact surfaces, which means that the desired temperature may be attained fast. In a preferred embodiment, the joining takes place in connection with the press rolls 21 and 22 driving the sheets forwards and, consequently, the sheets being in motion. In the other parts, the core bars 17 and 18 are not heated.

In a simple embodiment, the heating member 28 comprises electric heating conductors, which extend in the longitudinal direction of the core bars and which are supplied from conventional power supply units (not shown). It is also possible to transmit heat to abutting sheet portions in another way. The requisite energy may, e.g., be supplied to the contact surfaces through ultrasound, laser and other similar forms of energy permitting local or directed transmission of energy. The transmission of energy may also take place inductively or in a similar way and then be concentrated in the core bars 17 and 18, so that heating takes place locally.

As mentioned above, there may be different material compositions in the different sheets. Aluminium foil or a similar material may be used in some layer. In certain applications, it is suitable to use an intermediate layer, e.g. the sheet 16, with a lot of filler and two outer layers with less filler. Thereby, a sheet material is effected, which resists high load in the channel direction at the same time as the outer layers are very elastic. Such a sheet material is very suitable for use to packaging.

The material thickness may also vary in the different layers and according to the application in question. The sheet 16 that is to be corrugated may in that connection be made in a considerably thicker and stronger material than the other layers in order to obtain very good properties as for durability and impact resistance. In the same way, also other layers may be given desired properties as for, e.g., durability and impact resistance.

FIG. 3 shows an alternative embodiment with a third set of core bars 29 inserted between the upper line of core bars 17 and the lower line of core bars 18. The third line of core bars 29 has a cross-section adapted to other core bars and is provided with a second set of heating members 28' and 28". In the embodiment shown, the core bars 29 are made with square cross-section. Also the sheet which is to be corrugated is doubled in an upper corrugation sheet 16 and a lower corrugation sheet 16'. The double heating members 28' and 28" enable, together with the heating members 28 of the upper core bars 17 and the lower core bars 18, the composition of a more complex sheet material. As is seen in FIG. 3, the result is two outer plane layers and two inner corrugated layers.

FIG. 4 shows a simplified embodiment with only two material sheets. A lower sheet 20 is planar and a sheet 16 is corrugated in the same way as has been described above. In FIG. 5, an alternative embodiment is shown with a first corrugated sheet 16 and a second corrugated sheet 16'. In other respects, the embodiments according to FIG. 4 and FIG. 5 equal the embodiments described above.

The section view in FIG. 6 schematically shows how a device for corrugation of the sheet 16 may be made. A lower plate 15 is V-shaped with the sheet 16 moving towards the tip of the plate. The sheet 16 moves in the direction of the arrow V. The plate 15 is made with alternating v-shaped recesses and v-shaped ridges. The device for corrugation may be entirely omitted, if the resulting sheet material is not too wide. An upper plate 14 (see FIG. 7) with a corresponding shape fits into the recesses and ridges, respectively, of the lower plate 15.

The embodiment of the device for corrugation is seen more clearly in FIG. 7. The v-shaped recesses and ridges, respectively, are clearly shown in the figure. The shape of the recesses and of the ridges, respectively, is adapted to the shape of the core bars, so that the sheet is corrugated in the desired way, before it reaches the core bars. By virtue of the V-shape of the sheets 14 and 15, the sheet 16 will start to corrugate in a central portion. The sheet 16 is then corrugated outward toward the sides from the central portion as the sheet is fed forward. Thereby, too large a load on the sheet material during the corrugation process is avoided.

According to an alternative embodiment, the core bars are arranged in the same V-shape as the sheets 14 and 15 shown in FIG. 6, which thereby may be omitted.

What is claimed is:

1. A method of manufacturing multi-sheet corrugated material from first and second sheets which are adhered together, the first sheet having a wave shape defined by parallel-extending peaks and valleys, comprising:
   feeding the first sheet and the second sheet simultaneously;
   feeding the first sheet in a direction parallel to the peaks and valleys;
   orienting a plurality of elongated core bars to extend parallel to one another and to fit within the valleys of the first sheet while adjoining the peaks of the first sheet;
   feeding the first sheet onto the plurality of core bars with each core bar located in a valley and adjoining a peak of the first sheet;
   bringing the peaks of the first sheet into abutting contact with the second sheet at abutting contact portions of the sheets as the sheets are fed simultaneously;
   heating at only the abutting contact portions of at least one of the first and second sheets by
   transferring energy only from each core bar to heat the abutting contact portions as the first sheet is in motion;
   pressing the first and second sheets together at the abutting contact portions while at least one of the first and second sheets is heated to thereby adhere the two sheets together at the abutting contact portions; and
   performing said heating and pressing of the abutting contact portions as the sheets are in motion from said simultaneous feeding.

2. A method as defined in claim 1, further comprising:
   transferring thermal energy from each bar to heat the abutting contact portions.

3. A method as defined in claim 1, further comprising:
   pressing the first and second sheets together at the abutting contact portions by pressing the abutting contact portions against the core bars.

4. A method as defined in claim 3, further comprising:
   pressing the abutting contact portions against the core bars with a press roll.

5. A method as defined in claim 1, further comprising:
   forming the wave shape in the first sheet while the first sheet is being fed and prior to bringing the peaks of the first sheet into contact with the second sheet at the abutting contact portions.

6. A method as defined in claim 1, wherein the second sheet is planar.

7. A method as defined in claim 1, wherein the second sheet has a wave shape defined by parallel-extending peaks and valleys, and further comprising:
   bringing the peaks of the first and second sheets into abutting contact at the abutting contact portions as the sheets are fed simultaneously.

8. A device for manufacturing multi-sheet corrugated material from first and second sheets which are adhered together, the first sheet having a wave shape defined by parallel-extending peaks and valleys, comprising:
   a feed mechanism which contacts the first and second sheets and moves the sheets simultaneously in a longitudinal direction parallel to the peaks and valleys of the first sheet;
   a guide member positioned to receive the sheets moving simultaneously in the longitudinal direction and to guide the longitudinally moving sheets into contact with one another with the peaks of the first sheet abutting the second sheet at abutting contact portions of the sheets as the sheets are simultaneously moved in the longitudinal direction;
   a plurality of elongated core bars positioned stationarily to extend parallel to one another and parallel to the longitudinal direction, the plurality of core bars stationarily positioned to fit within the valleys of the first sheet while the sheets contact one another at the abutting contact portions and as the sheets are simultaneously moved in the longitudinal direction over the elongated core bars;
   each core bar including a local energy transfer element which transfers energy at only the abutting contact portions of the sheets while the sheets are simultaneously moved in the longitudinal direction over the elongated core bars, the local energy transfer element transferring sufficient energy to the abutting contact portions to heat at least one of the sheets at the abutting contact portions; and
   a press device positioned at a location relative to each core bar and the local energy transfer element of that core bar to press the first and second sheets together at the abutting contact portions after the one sheet is heated the press device pressing the sheets together at the abutting contact portions as the sheets are simultaneously moved in the longitudinal direction, the press device adhering the two sheets together at the abutting contact portions.

9. A device as defined in claim 8, wherein:
the energy transferred only from the core bars is sufficient to heat the abutting contact portions as the first sheet is in motion.

10. A device as defined in claim 8, wherein:
the guide member comprises at least one of the one core bars.

11. A device as defined in claim 8, wherein:
the local energy transfer element of each core bar extends along each core bar; and
the local energy transfer element transfers energy to the abutting contact portions along its length as the sheets are in motion relative to each core bar.

12. A device as defined in claim 11, wherein:
each local energy transfer element transfers thermal energy to the abutting contact portions.

13. A device as defined in claim 8, wherein:
the press device comprises a press roll which rolls in contact with one of the simultaneously moving sheets.

14. A device as defined in claim 13, wherein:
the press roll is positioned relative to the core bars to press the first and second sheets together at the abutting contact portions between the press roll and the core bars.

15. A device as defined in claim 8, further comprising:
a power supply providing energy to each local energy transfer element for transferring energy to the abutting contact portions of the sheets.

16. A device as defined in claim 8, wherein:
the first sheet is planar prior to the formation of the wave shape therein;
the feed mechanism contacts and moves the first planar sheet in the longitudinal direction; and further comprising:
a corrugation device receptive of the planar first sheet moved by the feed mechanism which is operative to form the wave shape in the first sheet prior to the first sheet encountering the guide member.

17. A device as defined in claim 8, wherein the second sheet is planar, and said device manufactures the corrugated material from the first and second sheets.

18. A device as defined in claim 8, wherein the second sheet has a wave shape defined by parallel-extending peaks and valleys, and wherein:
the guide member is positioned to guide the longitudinally moving sheets into contact with one another with the peaks of the first and second sheet abutting one another at the abutting contact portions of the sheets as the sheets are simultaneously moved in the longitudinal direction; and
the plurality of elongated core bars are positioned stationarily to fit within the valleys of the first and second sheets to heat the abutting contact portions as the sheets are simultaneously moved in the longitudinal direction over the elongated core bars.

* * * * *